(12) United States Patent
Karlsen et al.

(10) Patent No.: US 8,759,724 B2
(45) Date of Patent: Jun. 24, 2014

(54) EXTERNAL PROTECTION FOR DIRECT ELECTRIC HEATING CABLE

(75) Inventors: Jan Erik Karlsen, Kolbotn (NO); Lars Hennig, Berg (NO); Anders Henrik Bla, Halden (NO); Hans Kvarme, Fredrikstad (NO)

(73) Assignee: NEXANS, Paris (FR)

( * ) Notice: Subject to any disclaimer, the term of this patent is extended or adjusted under 35 U.S.C. 154(b) by 250 days.

(21) Appl. No.: 13/254,202

(22) PCT Filed: Mar. 25, 2010

(86) PCT No.: PCT/EP2010/053885
§ 371 (c)(1),
(2), (4) Date: Nov. 3, 2011

(87) PCT Pub. No.: WO2010/108976
PCT Pub. Date: Sep. 30, 2010

(65) Prior Publication Data
US 2012/0037611 A1 Feb. 16, 2012

(30) Foreign Application Priority Data
Mar. 25, 2009 (EP) .................................... 09305263

(51) Int. Cl.
H05B 3/34 (2006.01)
H01R 43/00 (2006.01)

(52) U.S. Cl.
USPC .............. 219/528; 219/529; 219/544; 29/868

(58) Field of Classification Search
USPC .................. 219/528–529, 544, 546, 548, 552
See application file for complete search history.

(56) References Cited

U.S. PATENT DOCUMENTS

| 5,813,106 A | 9/1998 | Haug et al. |
| 6,046,404 A | 4/2000 | Figenschou et al. |
| 6,612,370 B1 * | 9/2003 | Jahnsen et al. ................ 166/367 |
| 6,940,054 B1 | 9/2005 | Heggdal |
| 2003/0103811 A1 | 6/2003 | Grimseth |

FOREIGN PATENT DOCUMENTS

WO 9410492 5/1994

OTHER PUBLICATIONS

International Search Report dated May 18, 2010.

* cited by examiner

*Primary Examiner* — Shawntina Fuqua
(74) *Attorney, Agent, or Firm* — Sofer & Haroun, LLP

(57) ABSTRACT

The present invention concerns an elongated object (1) including a cable (2) being surrounded by an external protection (3*a*, 3*b*, 3*c*, 3*d*, 3*e*), said external protection comprising at least one protection layer including at least two elongated extruded hollow profiles (31*a*, 31*b*, 31*c*, 31*d*, 31*e*), each elongated extruded hollow profile comprising at least one elongated empty cavity (32), characterized in that each profile (31*a*, 31*b*, 31*c*, 31*d*, 31*e*) of said external protection is a single element along the whole length of the cable portion to be protected, and that the total cross section area of the empty parts of the external protection represents at least 20% of the total cross section area of the external protection.

14 Claims, 5 Drawing Sheets

EXTERNAL PROTECTION FOR DIRECT ELECTRIC HEATING CABLE

RELATED APPLICATIONS

This application is a National Phase application of PCT/EP2010/053885, filed on Mar. 25, 2010, which in turn claims the benefit of priority from European Patent Application No. 09 305 263.7, filed on Mar. 25, 2009, the entirety of which are incorporated herein by reference.

BACKGROUND

1. Field of the Invention

The present invention relates to an elongated object including a cable surrounded by at least one external protection, and to a manufacturing method of said elongated object.

The elongated object can typically be used in subsea. More particularly, the elongated object is in contact with a heating pipeline, and the cable of said elongated object can be a subsea pipeline direct electric heating (DEH) cable.

2. Description of Related Art

For heating of oil or gas pipelines in order to prevent hydrate and ice formation on the pipeline walls, a DEH cable is installed to supply current to such heating system. Such DEH cable, so called "piggyback" cable, is traditionally laid on the pipeline. More specifically such a cable is strapped to the pipeline during installation thereof.

DEH cable is based on the fact that an electric alternating current (AC) in a metallic conductor generates heat. The heated pipeline is an active conductor in a single phase AC electrical circuit, together with a single core high voltage cable strapped to the pipeline.

DEH cable can typically contain one or several conductors surrounded concentrically and successively by a conductor screen, a cross-linked polyethylene insulation and an insulation screen. It cannot have any metallic material such as armouring outside the protective sheath, since it would make possible an undesired electrical path for return current, hence detracting from the effectiveness of the system. Thus, the cable is generally protected by an external plastic protection from damage which may be caused by outer impact forces such as by fishing gears or falling objects.

An example of external plastic protection for DEH cable fixed to a heating pipeline, is presented in the document EP 1 686 301. This document proposes an electrical cable wrapped with an external protection. The external protection comprises several different cross sections arranged end to end around the electrical cable. The joints between the sections are staggered.

As mentioned in said document, the sections are obtained from great lengths extruded elements, said elements being coiled on a reel. Said reel is transported to a vessel and the elements are cut off with a length of about 3 m to form said sections. Then, the sections are laid around the cable drawn-off from a cable drum.

In another installation embodiment, directly after the extrusion step, the extruded elements can be cut off with a 3 meter-length to form said sections. Thus, the sections are packed on pallets for delivery to a vessel in view of their installation around the cable.

In all the cases, several sections of about 3 m each are necessary to protect the whole length of the cable portion to be protected.

However, the sections are not so easy to install around the cable due to the different type of sections, the staggering between joints and especially the sections preparation including the cut off of the sections.

In the domain of umbilical cables as described in U.S. Pat. No. 5,813,106 or WO01/16515, the umbilical cable, which classically is a signal cable or a 3-phase cable, is composed of a plurality of elongated channel elements surrounding a steel tube. Said elongate channel elements are adapted to receive conduits and cables. They are obtained from extruded PVC profiles, and may have voids in the operational configuration of the umbilical cable.

OBJECTS AND SUMMARY

However, said voids are only designed to reduce weight and use of material, so that they do not aim at protecting conduits or cables from impacts. The nature of the extruded material of the profiles (i.e. PVC) is as well not optimized for having a function of protection. Hence, the protection type of said umbilical cables is not optimized at all to withstand impacts from, for example, fishing gear or trawl boats. Typically, the protection type of umbilical cables can be able to withstand impacts up to 5 kJ.

The present invention seeks to solve the above-mentioned problems of the prior art, and proposes timeless-consuming installation of an external protection around a cable, said external protection having improved withstanding to impacts.

To this end, an object of the present invention is to provide an elongate object including a cable surrounded by an external protection, said external protection comprising at least one protection layer including at least two elongated extruded hollow profiles, each elongated extruded hollow profile comprising at least one elongated empty cavity, characterized in that each profile of said external protection is a single element along the whole length of the cable portion to be protected, and the total cross section area of the empty parts of the external protection represents at least 20% of the total cross section area of the external protection, and more preferably at least 30% of the total cross section area of the external protection, and more preferably at least 40% of the total cross section area of the external protection, and even more preferably at least 45% of the total cross section area of the external protection (in a cross section of the external protection).

The external protection can thus advantageously be able to withstand impacts more than 8 kJ, preferably more than 10 kJ, and even more preferably up to 20 kJ or more, from for example fishing gear or trawl boats. The measuring method to determine said impacts is according to Det Norske Veritas, DNV, Interference between trawl gear and pipelines, RP-F111, 2006 with a trawl door of 4000 kg and a speed of 2.8 m/s, and with a hammer having an outside diameter of 50 mm. In this measuring method, a height of the trawl door of 0.26 m will give an impact of 10.2 kJ and a height of the trawl door of 0.39 m will give an impact of 15.3 kJ.

Hence, the combination of at least two single elongated extruded hollow profiles forms the external protection around the whole length of the cable portion to be protected.

One understands by the terms "extruded hollow profile" any profile which includes an extruded material to form the walls of the profile, said extruded material surrounding or delimiting at least one empty cavity, said empty cavity being for example free of any cable, pipe, or tube in the operational configuration of the elongated object according to the invention.

One understands by the terms "single element" that each extruded hollow profile forms longitudinally a one-block structure along the whole length of the cable to be protected, so that the external protection is continuous and homogeneous along the cable: length of more than 3 meters of each elongated extruded hollow profile can advantageously be used along the cable, such as for example length of 1 km or more. Typical used length is 4 km.

More preferably, each elongated extruded hollow profile is a one-block structure in cross section, or in other terms, each elongated extruded hollow profile is not formed by assembling several different cross-sections arranged end to end around the cable.

Advantageously, the elongated object can be spooled around a drum to form an elongated object reel, especially be spooled around a drum with a typical minimum hub diameter of 4.3 m, an outside diameter of 8.6 m and a width of 4.8 m. Thus, the elongated object can be transported and installed in a long length without additional assembly work, especially at installation vessel. Each elongated extruded hollow profile can be as well spooled around a drum to form a profile reel.

In a particular embodiment, the external protection can further comprise:
- at least one elongated empty space between the outside surface of the cable and the protection layer at least partially in contact with said cable outside surface (first empty space type), and/or
- at least one elongated empty space between two successive protection layers (second empty space type).

Hence, the external protection can comprise the following empty parts: the elongated empty cavities, and optionally the first empty space type and/or the second empty space type.

In a cross section of the external protection, the total cross section area of the external protection comprises the sum of:
- the total cross section area of the material which is extruded to form the walls of the hollow profiles, and
- the total cross section area of the empty parts.

Said total cross section area of the empty parts comprises the sum of:
- the cross section area of the empty cavities delimited by the extruded material forming the walls of the hollow profiles,
- the cross section area of the empty space(s), if they exist, between the outside surface of the cable and the protection layer at least partially in contact with said cable outside surface (first empty space type), and
- the cross section area of the empty space(s), if they exist, between two successive protection layers (second empty space type).

In other words, the total cross section area of the external protection can be defined by the cross section area comprises from the outside surface of the cable to the outside periphery of the outermost protection layer of the external protection.

One understands by the term "cross section" the section which is perpendicular to the longitudinal axis of the cable.

A structural characteristic of the external protection can advantageously resides in that the external protection has a shape of a ring around the cable, in cross section, and more particularly the protection layer has the shape of a ring around the cable, in cross section.

One understands by the term "ring" a circular arrangement around the cable, said arrangement being composed of at least two extruded hollow profiles put side by side longitudinally along the cable.

In a first embodiment, and in a cross-section view, each extruded hollow profile of the ring comprises two concentric parts linked between them by two extremity parts, said four parts delimiting at least one empty cavity, said extruded hollow profile having the shape of a portion of said ring (i.e. ring portion).

The outside surface of the two extremity parts are at least partially in contact respectively with the outside surface of the two other extremity parts from another profile (when the ring only includes two ring portions) or from respectively two different profiles (when the ring includes at least three ring portions).

In the case where the external protection comprises at least two protection layers, the concentric part outside surface of a profile of the first protection layer can be at least partially in contact with the concentric part outside surface of a profile of the second protection layer.

In a second embodiment, each extruded hollow profile of the ring is a tube, and more particularly a right circular cylinder, delimiting only one elongated empty cavity.

The outside surface of a tube is at least partially in contact with the outside surface of at least two other tubes (when the ring includes at least three extruded hollow profiles).

In the case where the external protection comprises at least two protection layers, the tube outside surface of the first protection layer can be at least partially in contact with the tube outside surface of the second protection layer.

In a third embodiment, the characteristics of the first and second embodiments are combined.

The protection layer can include at least three elongated extruded hollow profiles, and more preferably at least six elongated extruded hollow profiles, in order to improve the spoolability of the elongated object.

The protection layer can also be stranded (or wound) along the cable. More particularly, it is the elongated extruded hollow profiles which are stranded along the cable. When the external protection comprises at least two protection layers, each successive protection layer can be alternatively stranded (or wound) in opposite direction around the cable.

Hence, when at least one protection layer is stranded around the cable, the external protection has advantageously an optimized withstanding to impacts, because the elongated extruded hollow profiles of the external protection can not be easily separated from the cable.

In a preferred embodiment, each protection layer includes structurally identical elongated extruded hollow profiles.

In a particular embodiment, each protection layer can comprise at least one hole in its wall thickness, in order to fill the elongated extruded hollow profiles faster with the sea water during the installation of said elongated object in the sea. More particularly, each elongated extruded hollow profile comprises at least said hole in its wall thickness. For example, each protection layer, or more particularly each elongated extruded hollow profile, can comprise a hole every 10-meter length along the elongated object.

The external protection can be made from a polymeric material, such a thermoplastic polymer, allowing to slow down an impact over a long deformation path and protect the cable in the case of a serious impact. By way of example, the polymer material is a polyolefin, such as for example polyethylene or polypropylene, and more particularly a glass reinforced polyethylene or glass reinforced polypropylene.

The external protection can be a semi-conductive or electrically insulating external protection. One understands by the term "semi-conductive" any external protection which can drain charging current to ground, without being too warm. According to IEC standard, the maximum temperature of the insulation system of a cable should not be higher than the conductor temperature in the operational configuration of the cable. The conductor temperature is typically not more than 90° C.

Classically, a semi-conductive material has an electrical conductivity between that of a conductor and an insulator, that is, generally in the range $10^3$ siemens per centimeter to $10^{-8}$ S/cm.

In a particular embodiment, the elongated object further includes a fixation mean to maintain the external protection around the cable.

In a first variant, the fixation mean surrounds the external protection. For example, said fixation mean can be a wrapped tape and/or an outer sheath around the external protection. The outer sheath can generally be an extruded layer made of polyethylene, polyamide or polypropylene, with a thickness for example comprises between 5 to 15 mm. When the fixation mean is an outer sheath, said sheath should have holes in its thickness in order to fill the elongated extruded hollow profiles faster with the sea water during the installation of said elongated object in the sea. For example, the outer sheath layer can comprise a hole every 10-meter length along the elongated object, and the hole diameter can be approximately of 15 mm.

In a second variant, the fixation mean is a constituent of the external protection, or in other words the external protection includes a fixation mean. Said fixation mean is able to maintain together two adjacent elongated extruded hollow profiles of the external protection.

More particularly, one of the two adjacent hollow profiles comprises a relief and the other one a housing, said relief being forcibly engaged in the housing of an adjacent hollow profile, the housing and the relief having complementary shapes adapted to prevent the relief from being disengaged from said housing.

When the elongated extruded hollow profiles are ring portions, the relief and the housing are disposed at the extremity part of two adjacent ring portions respectively.

In a third variant, the characteristics of the first and second variants are combined.

Furthermore, in another particular embodiment, the external protection can further comprise at least one elongated element able to detect elongated object damage.

More particularly, it is one of the elongated extruded hollow profiles which comprises said element. For example, the elongated extruded hollow profile is adapted to receive said element, in including an elongated space able to receive said elongated element, distinct from the empty cavity of the hollow profile.

By the way of example, the element can comprise at least one optical fiber, so that the proximity of the optical fiber to a elongated object fault will ensure that the fiber is broken before the cable has been damaged. Fiber break detection may be based on simple optical continuity through a looped fiber pair, or by more sophisticated methods like Optical Time Domain Reflectometry (OTDR).

Said element can advantageously be used when the external protection is a semi-conductive external protection, so that the leakage current can be transferred to the sea water when the elongated object is used in operational configuration.

In addition, when the elongated extruded hollow profiles are stranded, said element, integrated within said elongated hollow profile, is stranded as well, so that damage can be easily detect all around the elongated object.

In another embodiment related to the cable structure, the cable according to the invention is preferably an electrical cable, and more particularly an electrical power cable, comprising one or several electrical conductors, such as for example steel and/or copper conductors, surrounded by at least one insulating layer.

According to a specific embodiment of said cable when the cable is a DEH cable, the cable is a single-phase cable. Said cable can classically comprise one or several electrical conductors, such as for example steel and/or copper conductors, said electrical conductor(s) having a cross section area of at least 500 mm$^2$, and more preferably a cross section area of at least 1000 mm$^2$.

Said electrical conductor(s) are surrounded concentrically and successively by:
- a conductor screen able to give uniform electrical field distribution;
- a cross-linked polyolefin insulation, and more preferably a cross-linked polyethylene insulation;
- an insulation screen such as for example a polyolefin (e.g. polyethylene) insulation screen, which can be a semi-conductive insulation; and
- optionally, a polymeric (e.g. polyethylene) sheath in order to protect the insulation system, and to be a barrier for water ingress to the insulation system, said sheath can be as well a semi-conductive sheath.

According to a particular use of the elongated object, it can be at least partially in contact with a heating pipeline.

More particularly, it is the outside surface of the elongated object which is at least partially in contact with the outside surface of the heating pipe, along the cable.

The elongated object is preferably fixed to the heating pipeline outside surface, for example with tapes which are wrapped around the pipe as well as around the external protection of the cable.

Another object is a manufacturing method of the elongated object of the invention, said method comprising the steps consisting on:
i. laying-up each elongated extruded hollow profile around the cable portion to be protected in order to form at least one protection layer of the external protection, the cable being drawn-off from a cable drum and each hollow profile being respectively drawn-off from a profile drum station, and
ii. fixing the external protection around the cable.

BRIEF DESCRIPTION OF THE DRAWINGS

The present invention will become more fully understood from the detailed description given herein below and from the accompanying drawings which are given by way of illustration only, and thus, which are not limits of the present invention, and wherein:

FIG. 3b represents a cross section view of an external protection including elongated extruded hollow profiles according to FIG. 3a;

DETAILED DESCRIPTION

For reasons of clarity, the same elements are designed by identical references. Similarly, only those elements that are essential for understanding the invention are shown in diagrammatic manner, and scale is not complied with.

The FIGS. 1 to 7 are especially focused to detail examples of external protection structures according to the invention, and do not aim at focusing on the cable structure within the elongated object.

FIRST EMBODIMENT

Figure 1:
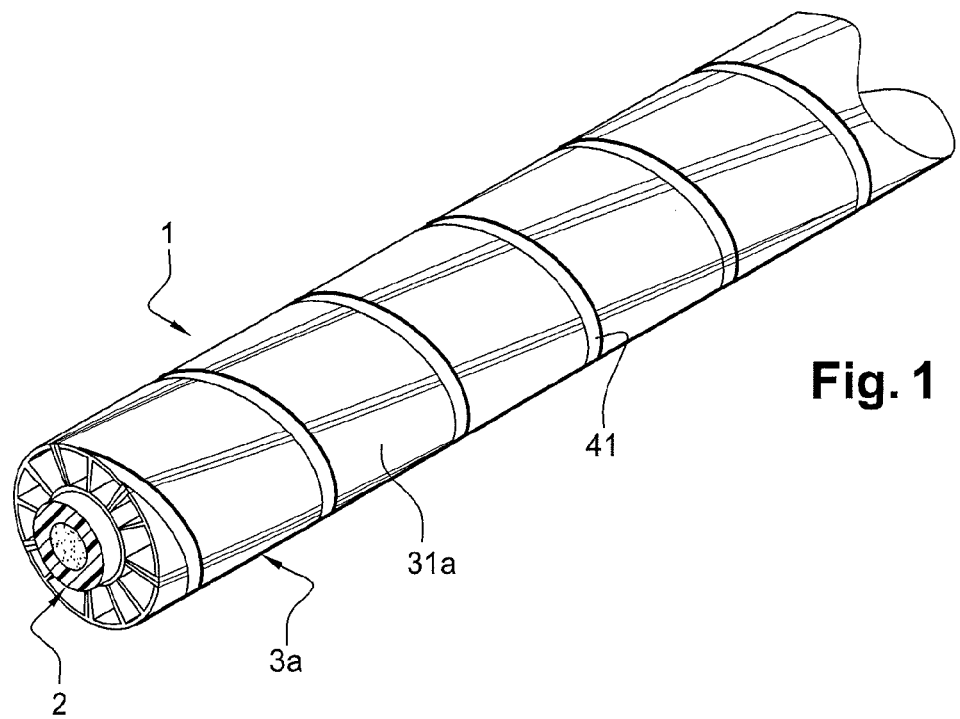
FIG. 1 represents a three-dimension view of an elongated object including an external protection according to the invention.

Each Elongated Extruded Hollow Profile has the Shape of a Portion of a Ring in Cross Section FIG. 1 illustrates a three dimension view of an elongated object 1 including a cable 2 surrounded by an external protection 3a according to the invention.

The external protection 3a is constituted by one protection layer forming a ring around the cable. Said external protection layer is composed of a plurality of extruded hollow profiles 31a disposed side by side and stranded around the cable 2.

Said external protection 3a is surrounded by a wrapped tape 41 in order to fix said external protection to the cable.

Figure 2:
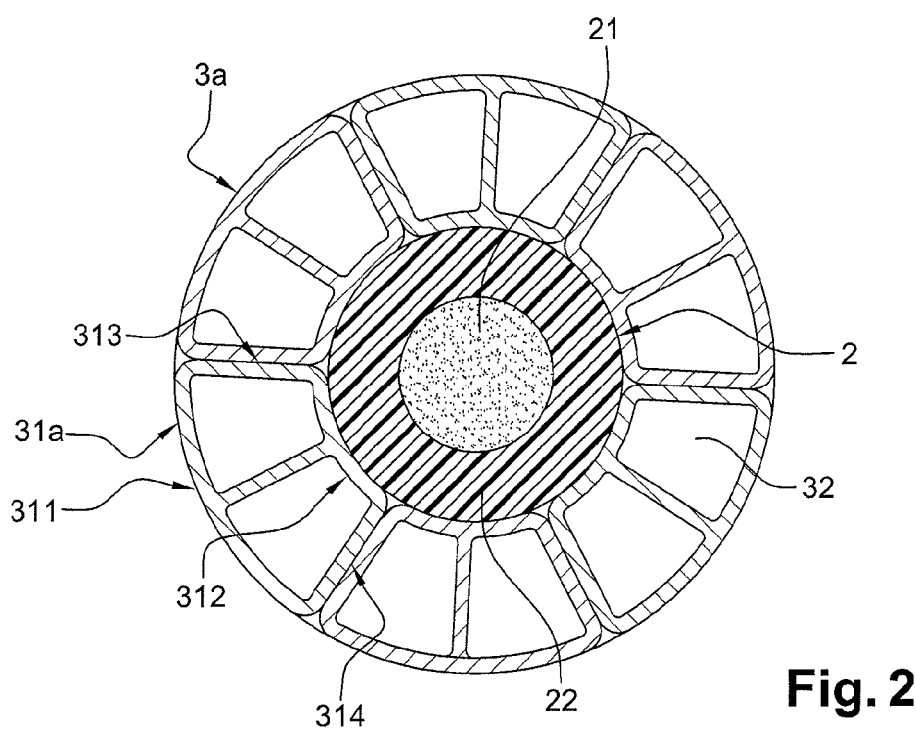
FIG. 2 represents a cross section view of the elongated object according to FIG. 1.

FIG. 2 represents a cross section view of the elongated object according to FIG. 1. The cable 2 comprises one or several electrical conductors 21 surrounded by at least one insulating polymeric layer 22.

The external protection 3a is composed of six identical and single elongated extruded hollow profiles 31a (i.e. respectively six portions of said ring), each profile 31a comprising two elongated empty cavities 32.

Each ring portion 31a includes two concentric parts 311, 312 linked between them by two extremity parts 313, 314. Each extremity part 313, 314 of a ring portion 31a abuts to one extremity part of another ring portion in order to form said ring around the cable 2. Said four parts 311, 312, 313, 314, or more particularly the wall thicknesses 311, 312, 313, 314 of the extruded hollow profile 31a, delimits two elongated empty cavities 32.

In this example relating to FIG. 2, the outside diameter of the cable 2 (ODc) is of 80 mm, the outside diameter of the external protection 3a (ODep) is of 160 mm, and the extruded wall thickness of each ring portion 31a is of 4 mm.

The table 1 as follows details one example of values which can be used according to the structure as represented in FIG. 2.

TABLE 1

| | |
|---|---|
| Extruded wall thickness of each ring portion (31a) | 4.0 mm |
| Total cross section area of the material which is extruded to form the walls of each ring portion (31a) | 6 ring portions × 864 mm² = 5184 mm² |
| Total cross section area of the external protection (3a) | 15079 mm² (calculated from ODc = 80 mm and ODep = 160 mm) |
| Total cross section area of empty parts | 15079 mm² − 5184 mm² = 9895 mm² |
| Total cross section area of empty parts | 9895 × 100%/15079 = 65.6% |

In the Table 1, the cross section area of the first and second empty space types are included in the total cross section area of the empty parts.

Figure 3A:
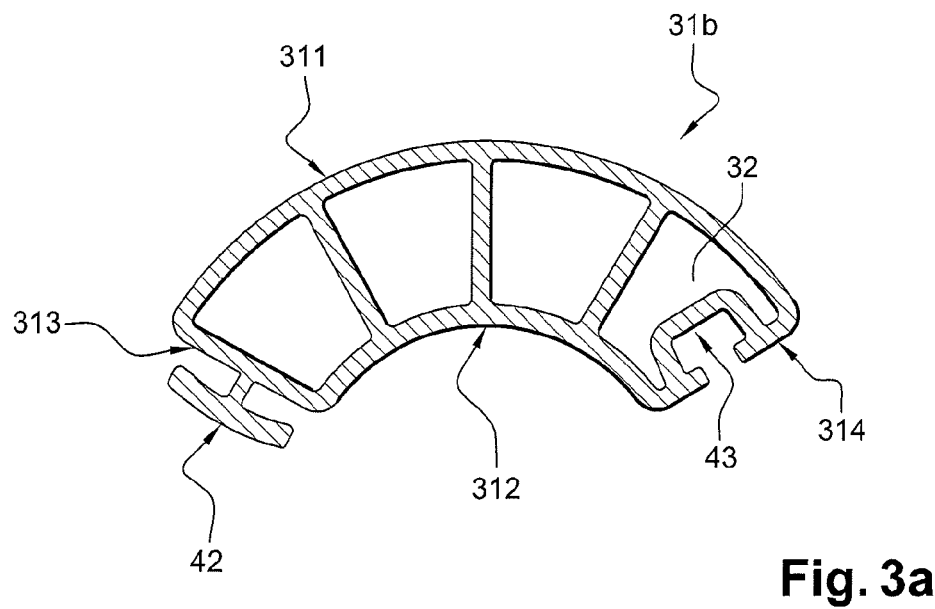
FIG. 3a represents a cross section view of an elongated extruded hollow profile according the invention.

FIG. 3a illustrates a cross section view of one single elongated extruded hollow profile 31b according to the invention.

Said profile 31b is a portion of a ring comprising four elongated empty cavities 32.

Each ring portion 31b includes two concentric parts 311, 312 linked between them by two extremity parts 313, 314.

One of the extremity part 313, 314 comprises a relief 42 and, the other one, a housing 43. In this specific embodiment, the relief 42 has a T-shape. The relief 42 and the housing 43 have complementary shapes.

Figure 3B:
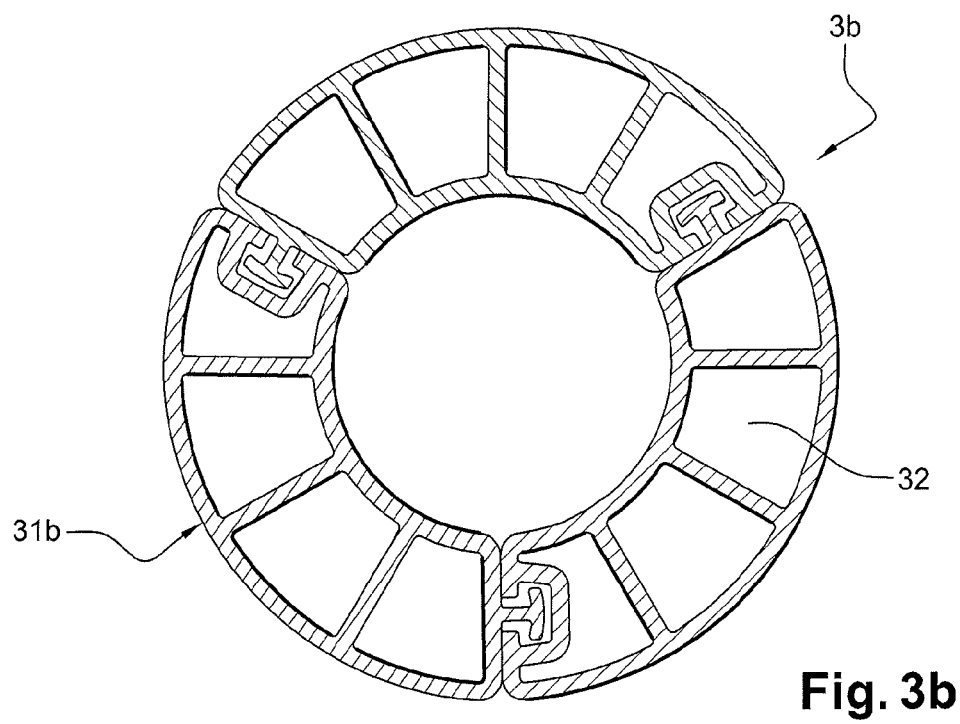

FIG. 3b represents a cross section view of an external protection including three identical and single elongated extruded hollow profiles 31b (respectively three ring portions) according to FIG. 3a.

Said three ring portions 31b are clipped together to form one protection layer 3b as a ring.

The relief of one ring portion 31b is forcibly inserted in and clipped into the housing of an adjacent ring portion by elastic deformation. Once all the ring portions are clipped, the external protection is maintained as such around the cable (no represented). In this case, an additional wrapped tape is preferably not necessary to maintain the external protection around the cable.

The value mentioned in the table 1 can be as well applied to the external protection of FIG. 3b.

Figure 4:
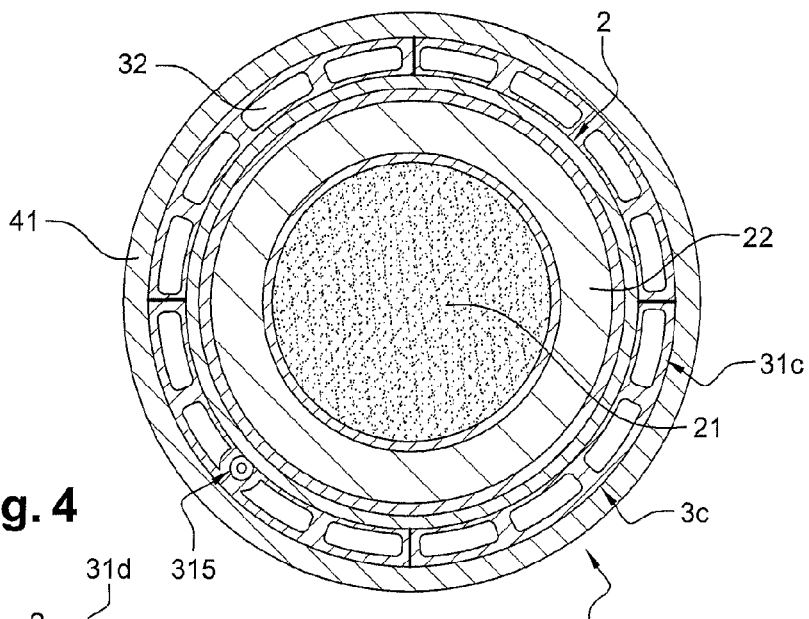
FIG. 4 represents a cross section view of an elongated object, including an external protection according to the invention, said elongated object comprising an element able to detect elongated object damage.

FIG. 4 represents a cross section view of an elongated object 1 including a cable 2 surrounded by an external protection 3c.

Said external protection 3c is constituted by one protection layer including four extruded elongated hollow profiles 31c (i.e. respectively four ring portions), each ring portions comprising four empty cavities 32.

The extruded protection 3c is similar in construction to the one according to FIG. 2.

The extruded hollow profiles 31c (or ring portions) are maintained around the cable 2 thanks to an outer sheath 41 as a fixation mean.

The particularity of the FIG. 4 resides in that it shows an example of an elongated element 315 able to detect elongated object damage, said element 315 being longitudinally integrated in the external protection 3c of the elongated object 1.

Said element 315 is an optical fiber assembled inside the extruded wall thickness of one hollow profile 31c. The stranding of the extruded hollows profiles 31c allows to the optical fiber 315 to be all around the cable 2 along the elongated object.

Figure 5A:
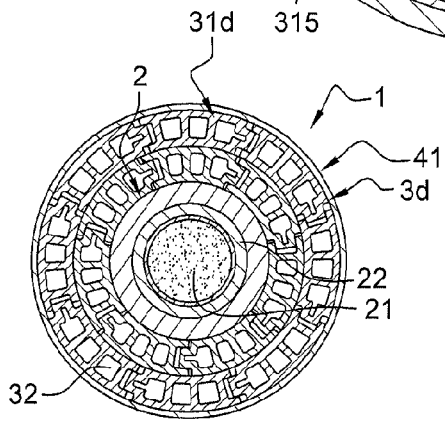
FIG. 5a represents a cross section view of an elongated object including an external protection according to the invention.

FIG. 5a represents a cross section view of an elongated object 1 including a cable 2 surrounded by an external protection 3d, said external protection 3d comprising two protection layers around the cable.

The first protection layer is in contact with the cable 2 and comprises seven identical and single ring portions 31d are associated together, or clipped together, to form a first ring.

The second protection layer surrounds the first protection layer and comprises eight identical and single ring portions 31*d* clipped together to form a second ring. The second protection layer is in contact with the first protection layer.

Said two successive protection layers can be alternatively stranded in opposite direction around the cable.

In this figure, all the ring portions have identical structure and each of them comprises three empty cavities 32. The fixation structure of the first and the second rings have been already illustrated in FIG. 3*b*.

Once all the ring portions 31*d* of the first and the second rings are clipped to form the external protection, the latter can be maintained around the cable by an outer sheath 41, said outer sheath comprising holes perforated in its thickness every 10 meters length (not represented).

In this example relating to FIG. 5*a*, the outside diameter of the cable 2 (ODc) is of 80 mm, the outside diameter of the external protection 3*d* (ODep) is of 152 mm, and the extruded wall thickness of each ring portion 31*d* is of 4 mm.

The table 2 as follows details one example of values which can be used according to the structure as represented in FIG. 5*a*.

TABLE 2

| | |
|---|---|
| Extruded wall thickness of each ring portion (31d) | 4.0 mm |
| Total cross section area of the material which is extruded to form the walls of each ring portion (31d) | 7 ring portions × 530 mm$^2$ + 8 ring portions × 596 mm$^2$ = 8478 mm$^2$ |
| Total cross section area of the external protection (3d) | 13119 mm$^2$ (calculated from ODc = 80 mm and ODep =152 mm) |
| Total cross section area of empty parts | 13119 mm$^2$ − 8478 mm$^2$ = 4641 mm$^2$ |
| Total cross section area of empty parts | 4641 × 100%/13119 = 35.4 % |

In the Table 2, the ring portions of the first protection layer and of the second protection layer are extruded in separated tools, so that the total cross section area of the material which is extruded to form the walls of each ring portion is substantially different for the first and for the second protection layers (cf. 530 mm$^2$ and 596 mm$^2$).

In addition, the cross section area of the first and second empty space types are included in the total cross section area of the empty parts.

Figure 5B:
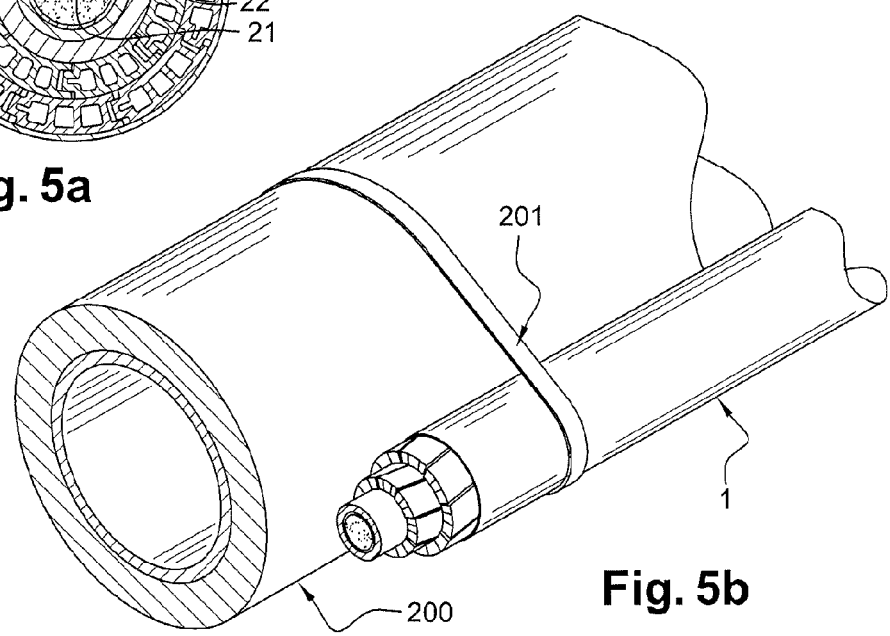
FIG. 5b represents a three-dimension view of the elongated object according to FIG. 5a, said elongated object being in contact with a heating pipeline.

FIG. 5*b* represents a three-dimension view of the elongated object 1 as illustrated in FIG. 5*a*, said elongated object 1 being in contact with a heating pipeline 200.

Said elongated object 1 is maintained onto the pipeline outside surface by strapping said object with a fixation element 201.

The FIG. 5*b* further shows that the two successive protection layers are alternatively stranded in opposite direction around the cable.

In this first embodiment, each elongated extruded hollow profile can comprise holes (not represented) regularly positioned along the elongated object in order to fill said elongated extruded hollow profiles faster with the sea water during the installation of said elongated object in the sea. For example, each hole has typical a diameter of 5 mm.

SECOND EMBODIMENT

Each Elongated Extruded Hollow Profile is a Tube

Figure 6A:
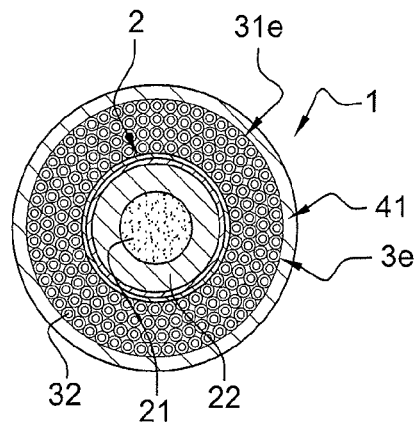
FIG. 6a represents a cross section view of an elongated object including an external protection according to the invention.

FIG. 6*a* illustrates a cross-section view of an elongated object 1 including a cable 2 surrounded by an external protection 3*e* according to the invention, said external protection 3*e* forming a ring around the cable 2

Said external protection 3*e* comprises four protection layers around the cable 2. Each protection layer is composed of a plurality of extruded hollow profiles 31*e*, each extruded hollow profile 31*e* being a tube delimiting one empty cavity 32.

The first protection layer is directly in contact with the cable and comprises 31 identical and single tubes in contact the ones with the others to form the first ring.

The second protection layer surrounds the first protection layer and comprises 34 identical and single tubes in contact the ones with the others to form the second ring, the second protection layer being partially in contact with the first protection layer.

The third protection layer surrounds the second protection layer and comprises 40 identical and single tubes in contact the ones with the others to form the third ring, the third protection layer being partially in contact with the second protection layer.

The fourth protection layer surrounds the third protection layer and comprises 46 identical and single tubes in contact the ones with the others to form the fourth ring, the fourth protection layer being partially in contact with the third protection layer.

Said four successive protection layers can be alternatively stranded in opposite direction around the cable.

The fourth protection layer of the external protection is surrounded by an outer sheath 41 in order to fix said external protection 3*e* around the cable, said outer sheath comprising holes perforated in its thickness every 10 meters length (not represented).

In the example related to FIG. 6*a*, the outside diameter of each tube is 9 mm, and its inside diameter is 4.5 mm, so that the extruded wall thickness of each ring portion 31*e* is of 2.25 mm. The outside diameter of the cable (ODc) is 80 mm and the outside diameter of the external protection (i.e. four protection layers superimposed) (ODep) is of 152 mm.

The table 3 as follows details one example of values which can be used according to the structure as represented in FIG. 6*a*.

TABLE 3

| | |
|---|---|
| Extruded wall thickness of each hollow profile (i.e. each tube) (31e) | 2.25 mm |
| Total cross section area of the material which is extruded to form the walls of each hollow profile(31e) (151 tubes) | 151 tubes × 47.7 mm$^2$ = 7203 mm$^2$ |
| Total cross section area of the external protection (3e) | 13119 mm$^2$ (calculated from ODc = 80 mm and ODep =152 mm) |
| Total cross section area of empty parts | 13119 mm$^2$ − 7203 mm$^2$ = 5916 mm$^2$ |
| Total cross section area of empty parts | 5916 × 100%/13119 = 45% |

In the Table 3, the cross section area of the first and second empty space types are included in the total cross section area of the empty parts.

More particularly, the cross section area of:
the first empty space type is considered equal to 209 mm$^2$ (total area from the outside of the cable to the center of the first tube layer=π×(89$^2$−80$^2$)/4=1195 mm$^2$; half of the area of the first tube layer=31×(π×9$^2$)/(4×2)=986 mm$^2$; empty space=1195−986=209 mm$^2$);

the second empty space type is considered equal to 2685 mm$^2$, so that it is the sum of:

the empty space between the first and the second layers is 704 mm$^2$ (area from the center of the first tube layer to the center of the second tube layer=$\pi\times(107^2-89^2)/4$=2771 mm$^2$; half area of the first tube layer and half area of the second tube layer: $(31+34)\times\pi\times9^2/(4\times2)$=2067 mm$^2$; empty space=2771-2067=704 mm$^2$); and the empty space between the second and the third layers is 927 mm$^2$: area from the center of the second tube layer to the center of the third tube layer=$\pi\times(125^2-107^2)/4$=3280 mm$^2$; half area of the second tube layer and half area of the third tube layer=$(34+40)\times63.6/2$=2353 mm$^2$; empty space=3280-2353=927 mm$^2$); and the empty space between the third and the fourth layers is 1054 mm$^2$: area from the center of the third tube layer to the center of the fourth tube layer=$\pi\times(143^2-125^2)/4$=3789 mm$^2$; half area of the third tube layer and half area of the fourth tube layer=$(40+46)\times63.6/2$=2735 mm$^2$; empty space=3789-2735=1054 mm$^2$).

In a variant (not represented) of this second embodiment, the external protection comprises two protections layers forming respectively two rings around the cable.

Each ring is composed of a plurality of identical tubes put side by side, as represented in FIG. 5a.

The first protection layer is directly in contact with the cable and comprises 17 identical and single tubes in contact the ones with the others to form the first ring.

The second protection layer surrounds the first protection layer and comprises 23 identical and single tubes in contact the ones with the others to form the second ring, the second protection layer being partially in contact with the first protection layer.

Said two successive protection layers can be alternatively stranded in opposite direction around the cable.

The outside diameter of each tube is 18 mm, and its inside diameter is 12 mm, so that the extruded wall thickness of each ring portion is of 3 mm. The outside diameter of the cable (ODc) is 80 mm and the outside diameter of the external protection (i.e. two protection layers superimposed) (ODep) is of 152 mm.

The table 4 as follows details one example of values which can be used according to this two-protection layer structure.

TABLE 4

| | |
|---|---|
| Extruded wall thickness of each hollow profile (i.e. each tube) | 3 mm |
| Total cross section area of the material which is extruded to form the walls of each hollow profile (40 tubes) | 40 tubes × 141 mm$^2$ = 5640 mm$^2$ |
| Total cross section area of the external protection | 13119 mm$^2$ (calculated from ODc = 80 mm and ODep = 152 mm) |
| Total cross section area of empty parts | 13119 mm$^2$ − 5640 mm$^2$ = 7479 mm$^2$ |
| Total cross section area of empty parts | 7479 × 100%/13119 = 57.0% |

In the Table 4, the cross section area of the first and second empty space types are included in the total cross section area of the empty parts.

More particularly, the cross section area of:

the first empty space type is considered equal to 353 mm$^2$ (total area from the outside of the cable to the center of the first tube layer=$\pi\times(98^2-80^2)/4$=2516 mm$^2$; half of the area of the first tube layer=$17\times(\pi\times18^2)/(4\times2)$=2163 mm$^2$; empty space=2516-2163=353 mm$^2$);

the second empty space type is considered equal to 1471 mm$^2$ (area from the center of the first tube layer to the center of the second tube layer=$\pi\times(134^2-98^2)/4$=6560 mm$^2$; half area of the first tube layer and half area of the second tube layer=$(17+23)\times(\pi\times18^2)/(4\times2)$=5089 mm$^2$; empty space=6560-5089=1471 mm$^2$).

Figure 6B:
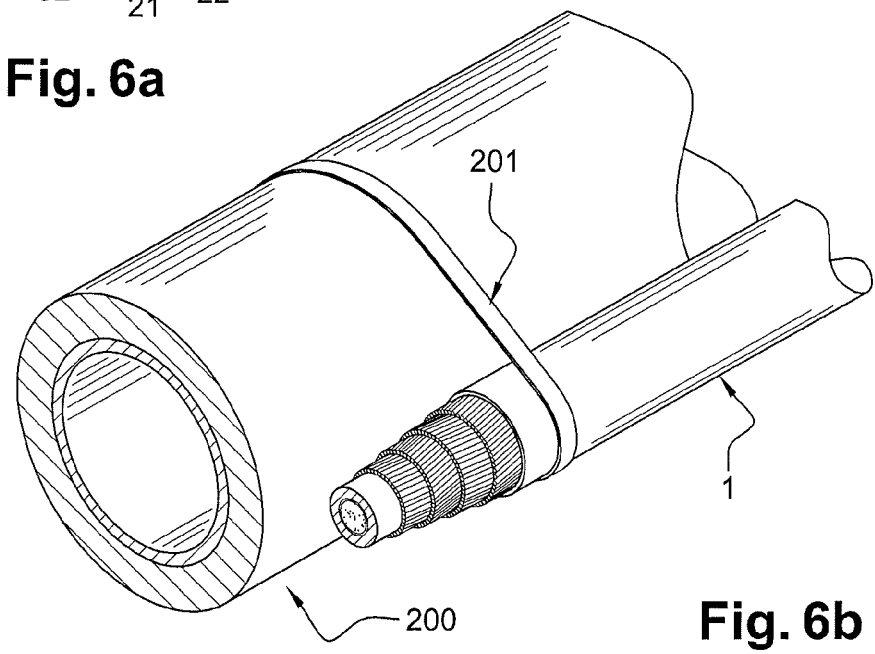
FIG. 6b represents a three-dimension view of the elongated object according to FIG. 6a, said elongated object being in contact with a heating pipeline.

FIG. 6b represents a three-dimension view of the elongated object 1 according to FIG. 6a, said elongated object 1 being in contact with a heating pipeline 200.

Said elongated object 1 is maintained onto the pipeline outside surface by strapping said object with a fixation element 201.

The FIG. 6b further shows that the four successive protection layers are alternatively stranded in opposite direction around the cable.

In this second embodiment, each elongated extruded hollow profile (i.e. each tube) can comprise holes (not represented) regularly positioned along the elongated object in order to fill said elongated extruded hollow profiles faster with the sea water during the installation of said elongated object in the sea. For example, each hole has typical a diameter of 3 mm.

The outside diameter of the cable, the outside diameter of the external protection, the extruded wall thickness of each hollow profile, the number of protection layers, the number of empty cavities per hollow profile, the number of extruded hollow profiles and/or the number of ring portions are given by way of illustration only, and thus, do not limit the present invention.

Advantageously, the external protections according to the present invention can be able to withstand impacts more than 8 kJ, and more particularly between 8 to 12 kJ, according to the measuring method Det Norske Veritas, DNV, Interference between trawl gear and pipelines, RP-F111, 2006 with a trawl door of 4000 kg, a speed of 2.8 m/s, and a height of 0.26 m; and with a hammer having an outside diameter of 50 mm.

Figure 7:
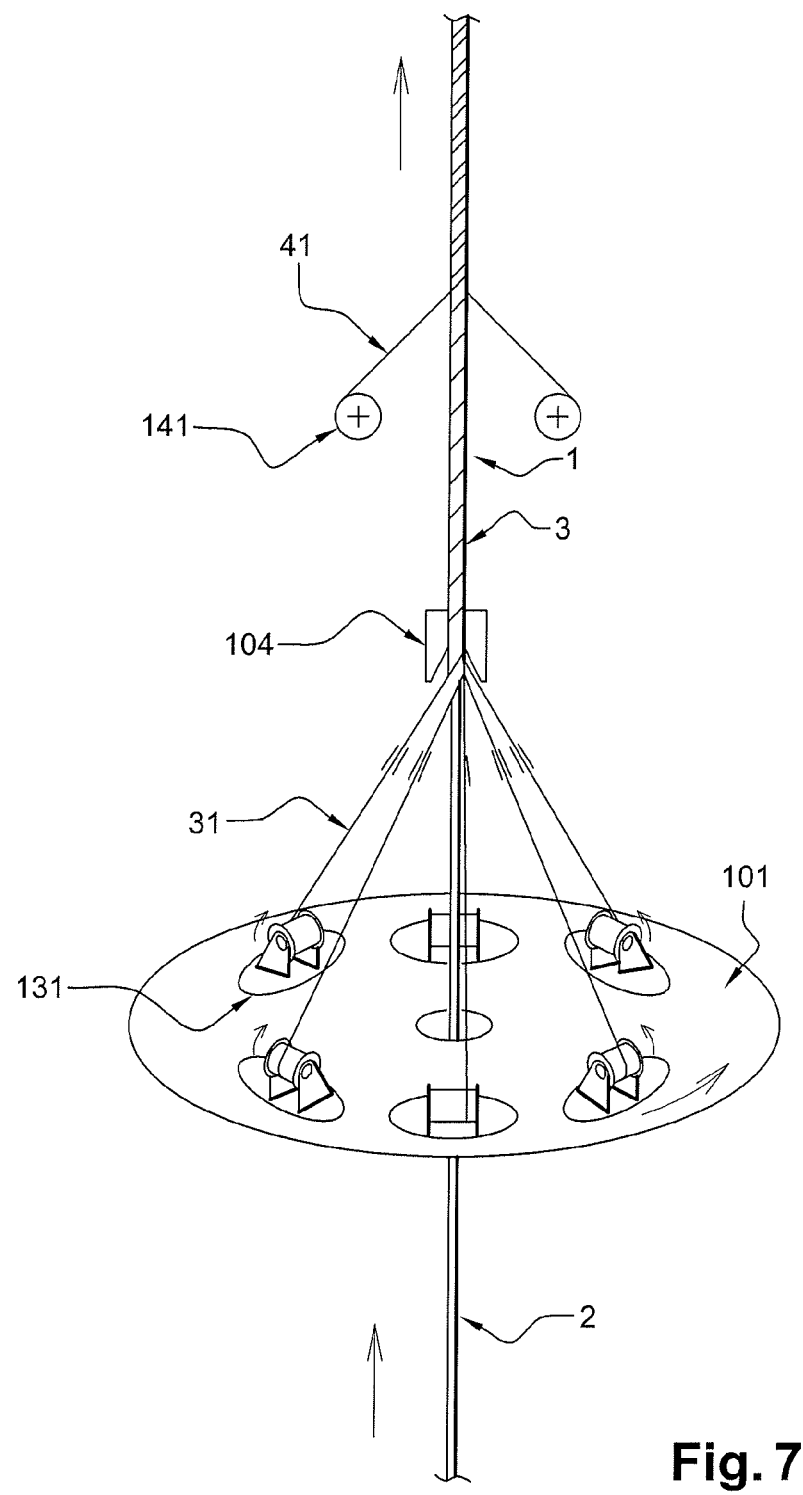
FIG. 7 represents a schematic view of a manufacturing method of the elongated object according to FIGS. 1 to 6.

FIG. 7 shows a schematic view of a manufacturing method of the elongated object according to FIGS. 1 to 6.

The cable 2 is drawn-off from a cable drum (not represented) through a culvert in the center of a table 101 of a lay-up machine. The table 101 comprises six profile drum stations 131 from which single extruded hollow profiles 31 are drawn-off in continuous. Said profile drum stations 131 are disposed at equal distance from the table center. The table 101 as well as the drum stations 131 are able to rotate, especially to rotate in opposite directions, in order to obtain a stranded (or wound) external protection.

The extruded hollow profiles 31 as well as the cable 2 are guided and gathered towards a lay-up nipple 104 (collecting point) of the lay-up machine, so that the extruded hollow profiles 31 are laid-up around the cable 2 to form a ring-type external protection and to obtain the elongated object 1 according to the invention.

In order to maintain the elongated extruded hollow profiles 31 around the cable 2, a tape 41 is drawn-off from a wrapping machine 141 and is wrapped around the ring-type external protection.

In addition, an outer sheath (not represented) can be extruded around the wrapped tape in order to additionally protect the cable. Said outer sheath can advantageously comprises holes in order to let the water cooling the cable when the elongated object is under sea.

In the case where the external protection includes a fixation mean, such as mentioned for example in FIGS. 3a and 3b, the single elongated extruded hollow profiles are clipped by elastic deformation when profiles are collected at the lay-up nipple 104.

The invention claimed is:

1. Elongated object comprising:
   a cable having one or more electrical conductors, the one or more conductors being surrounded as a group by at least one insulating layer; and
   an external protection in the shape of a ring surrounding said cable, said external protection having at least one protection layer including at least two elongated extruded hollow profiles, each elongated extruded hollow profile having at least one elongated empty cavity, wherein each elongated extruded hollow profile of said external protection is a single element along the whole length of the cable portion to be protected, and that a total cross section area of the empty parts of the external protection represents at least 20% of the total cross section area of the external protection.

2. Object according to claim 1, wherein each extruded hollow profile has a shape of a portion of said ring in cross section.

3. Object according to claim 1, wherein each extruded hollow profile is a tube.

4. Object according to claim 1, wherein the protection layer includes at least three elongated extruded hollow profiles.

5. Object according to claim 1, wherein the protection layer is stranded along the cable.

6. Object according to claim 5, wherein when the external protection includes two or more protection layers, each successive protection layer is alternatively stranded in opposite directions around the cable.

7. Object according to claim 1, the protection layer includes structurally identical elongated extruded hollow profiles.

8. Object according to claim 1, wherein the elongated extruded hollow profiles are obtained from a polymeric material.

9. Object according to claim 1, wherein said object further includes a fixation mean.

10. Object according to claim 9, wherein the fixation mean surrounds the external protection.

11. Object according to claim 1, the fixation mean is a constituent of the external protection.

12. Object according to claim 1, wherein the external protection further comprises an elongated element able to detect elongated object damage.

13. Object according to claim 1, wherein said object is at least partially in contact with a heating pipeline.

14. Method of manufacturing of an elongated object according to claim 1, comprising the steps of:
    laying-up each elongated extruded hollow profile around the cable portion to be protected in order to form at least one protection layer of the external protection, the cable being drawn-off from a cable drum and each hollow profile being respectively drawn-off from a profile drum station; and
    fixing the external protection around the cable.

* * * * *